United States Patent [19]

Ishizaka et al.

[11] 4,314,752
[45] Feb. 9, 1982

[54] MOUNT DEVICE OF A FOCAL LENGTH CHANGING AUXILIARY LENS

[75] Inventors: Sunao Ishizaka; Toshiaki Hozumi, both of Tokyo, Japan

[73] Assignee: Nippon Kogaku K.K., Tokyo, Japan

[21] Appl. No.: 182,070

[22] Filed: Aug. 28, 1980

[30] Foreign Application Priority Data

Sep. 17, 1979 [JP] Japan .......................... 54/126840[U]

[51] Int. Cl.³ .......................... G03B 7/20; G03B 9/02
[52] U.S. Cl. ...................................... 354/286; 354/46
[58] Field of Search ...................... 350/252, 255, 257; 354/46, 196, 286, 289

[56] References Cited

U.S. PATENT DOCUMENTS

| | | | |
|---|---|---|---|
| 3,495,514 | 2/1970 | Nakamura et al. | 354/46 |
| 3,675,550 | 7/1972 | Ishizaka | 354/46 |
| 3,889,282 | 6/1975 | Hashimoto | 354/196 |
| 3,961,347 | 6/1976 | Sekida | 354/46 X |
| 3,968,504 | 7/1976 | Komine | 354/46 |
| 4,003,068 | 1/1977 | Hashimoto et al. | 354/286 |
| 4,141,636 | 2/1979 | Shimojima | 354/196 |

FOREIGN PATENT DOCUMENTS 2922021 12/1979 Fed. Rep. of Germany ...... 354/286

*Primary Examiner*—Donald A. Griffin
*Attorney, Agent, or Firm*—Fitzpatrick, Cella, Harper & Scinto

[57] ABSTRACT

An auxiliary lens capable of being mounted between an interchangeable lens having on the mount thereof means for generating a minimum F-number signal and a camera having means for detecting said signal on a mount to which the interchangeable lens may be mounted and including a circuit receiving as input the detected signal and an output based on the light passed through the interchangeable lens to effect an exposure operation. The auxiliary lens includes an optical system for changing the focal length of the interchangeable lens. The auxiliary lens is provided with transmitting means capable of being coupled to each of the signal generating means and the detecting means during said mounting and adapted to transmit the signal to the camera by said coupling, and a signal member having information corresponding to a variation in the F-number caused by the change of said focal length and capable of transmitting the information to the camera during said mounting.

9 Claims, 4 Drawing Figures

MOUNT DEVICE OF A FOCAL LENGTH CHANGING AUXILIARY LENS

BACKGROUND OF THE INVENTION

1. Field of the Invention

This invention relates to an auxiliary lens for changing the focal length of an interchangeable lens of a camera, and particularly to a mount device of the auxiliary lens mounted between the camera and the interchangeable lens.

2. Description of the Prior Art

As an accessory device for changing the focal length of an interchangeable lens, for example, from f=50 mm to f=100 mm, there is already known a rear conversion lens of the type mounted between the interchangeable lens and the camera body. When such a rear conversion lens is used, the minimum F-number of the interchangeable lens as a whole including the conversion lens is increased in accordance with the amount of variation in the focal length.

On the other hand, interchangeable lenses having on the mount thereof means for generating a minimum F-number signal are already known. This F-number signal is applied to and processed by the exposure meter, the shutter speed priority automatic exposure control device or the program automatic exposure control device of a camera. Accordingly, where the aforementioned interchangeable lens and conversion lens are mounted to a camera provided with these devices, malfunctioning or wrong exposure would occur unless the minimum F-number signal of the interchangeable lens is corrected by an amount of variation in F-number and then transmitted to these devices of the camera.

SUMMARY OF THE INVENTION

It is the object of the present invention to provide a focal length changing auxiliary lens which can transmit the minimum F-number signal of an interchangeable lens to a camera and also can correct such signal automatically for a variation in minimum F-number.

The auxiliary lens of the present invention, when mounted between an interchangeable lens having on the mount thereof means for generating a minimum F-number signal corresponding to the open aperture and a camera having means for detecting the signal, includes signal transmitting means capable of being coupled to each of said signal generating means and said detecting means, and a signal member having information corresponding to the variation in said F-number caused by the change of the focal length and capable of transmitting the information to a camera during the mounting.

The invention will become more fully apparent from the following detailed description thereof taken in conjunction with the accompanying drawings.

DESCRIPTION OF THE PREFERRED EMBODIMENTS

Figure 1:
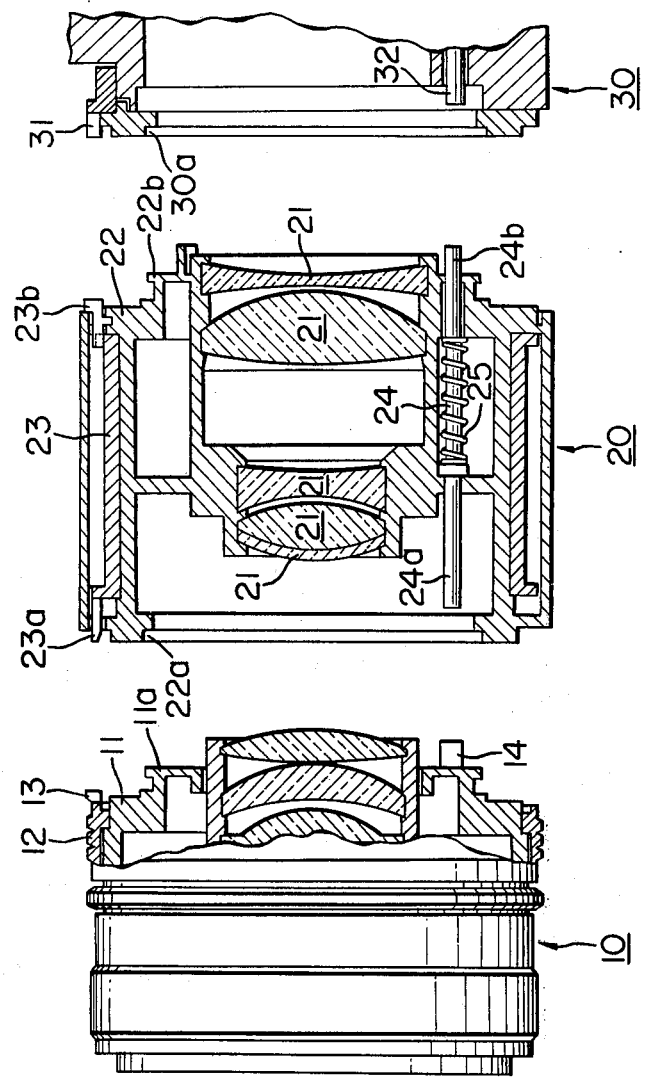
FIG. 1 is a cross-sectional view of an embodiment of the present invention and showing the relation among an interchangeable lens, a rear conversion lens and a camera body.

Referring to FIG. 1, an interchangeable lens 10 has a male bayonet mount 11a integral with a fixed barrel 11, a preset aperture ring 12 rotatably supported on the fixed barrel 11, a first signal member 13 secured to the preset aperture ring 12 and generating, by a positional variation, aperture step number information (hereinafter referred to as the step number signal) corresponding to the difference between the minimum F-number and the preset aperture value of the interchangeable lens 10, and a second signal member 14 provided on the bayonet mount 11a and projected in the direction of the optical axis, the amount of projection thereof corresponding to the minimum F-number of the interchangeable lens 10.

A rear conversion lens 20 has lens group 21 for changing the focal length of the interchangeable lens to double or triple, a female bayonet mount 22a provided integrally with a base 22 so as to be capable of being coupled to the mount 11a of the interchangeable lens 10, a male bayonet 22b provided integrally with the base 22, a first transmitting member 23 rotatably supported on the base 22 and introducing the positional variation (i.e. the rotational angle) of the first signal member 13 at a terminal 23a and transmitting it as the same positional variation to a terminal 23b, and a second transmitting member 24 detecting the amount of projection of the second signal member 14 of the interchangeable lens and causing a terminal 24b to be projected in accordance with said amount of projection, the second transmitting member 24 being provided for sliding movement in the direction of the optical axis and leftwardly biased by a spring 25. The amount of projection of the second transmitting member 24 when the interchangeable lens 10 and the conversion lens 20 are coupled together is the same as the amount of projection of the first signal member 14 with respect to a predetermined reference surface. Accordingly, the first and second transmitting members transmit the information of the first and second signal members intactly to the camera body side.

The camera body 30 has a female bayonet mount 30a capable of being coupled to the bayonet mount 11a or 22b, a first detecting member 31 engageable with the first signal member 13 or the output terminal 23b of the first transmitting member 23 to introduce the step number signal in response to rotation thereof, and a second detecting member 32 for detecting the amount of projection of the first signal member 14 or the amount of projection of the output terminal 24b of the second transmitting member 24.

With the above-described construction, when the interchangeable lens 10 is mounted to the camera body 30, the step number signal is directly transmitted from the first signal member 13 to the first detecting member 31 and the minimum F-number signal is directly transmitted from the second signal member 14 to the second detecting member 32, and when the rear conversion lens 20 is mounted between the lens 10 and the camera body 30, said signals are transmitted to the camera body through the first and second transmitting members 23 and 24, respectively.

Figure 2:
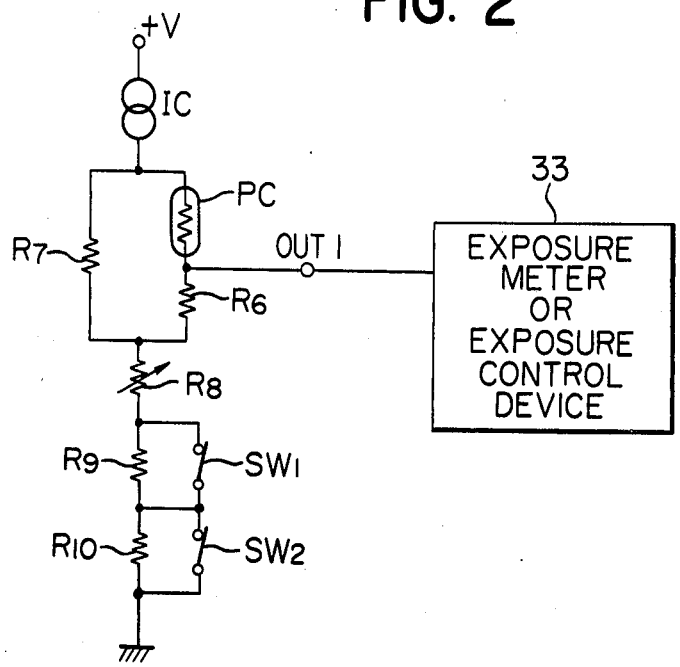
FIG. 2 is a circuit diagram related to the metering circuit of a camera.

The signals (mechanical) thus transmitted to the camera body act in a metering circuit in the following manner. That is, in FIG. 2, a circuit comprising resistors R6, R7 and a light-receiving element Pc generates a voltage corresponding to the object brightness Bv across the resistors R6. A variable resistor R8 exhibits a resistance value corresponding to the film speed Sv and the preset aperture value Av.preset. This variable resistor R8 has its resistance value variable in accordance with a formula $Sv - (Av.preset - Av_0) + Av_0$, and $(Av.present - Av_0)$ is mechanically introduced as the step number signal from the first signal member 13, and $Av_0$ is mechanically introduced as the minimum F-number signal from the second signal member 14. In accordance with these signals, the brush of the variable resistor or the resistor itself is moved and adjusted to a resistance value corresponding to said calculation formula. Correction resistors R9 and R10 will later be described and it is considered here that switches Sw1 and SW2 have been closed. Then, this circuit supplied with a current from a constant current source Ic generates at its output terminal $out_1$ $Bv + Sv - Av.preset = Tv$, namely, a voltage corresponding to a proper shutter speed. The output voltage of this output terminal $out_1$ is applied to an exposure meter or an automatic exposure control device 33.

Figure 4:
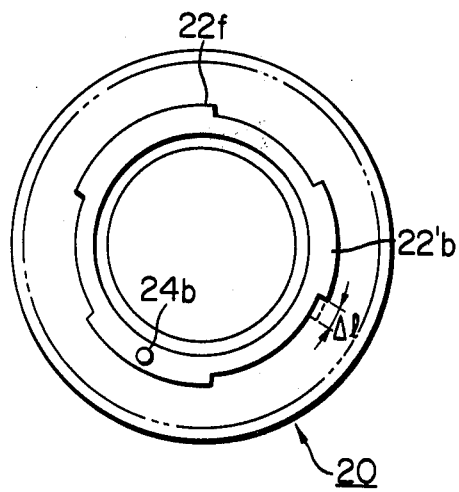
FIG. 4 is a front view of the mount portion of the conversion lens according to an embodiment of the present invention.

Now, in this circuit, correction of F-number signal (particularly in said circuit, correction of minimum F-number signal must be effected by detecting which of the interchangeable lens 10 and the rear conversion lens 20 has been mounted to the camera body. Therefore, as shown in FIG. 4, the circumferential length of one of a plurality of teeth, 22b' projected in a direction orthogonal to the male bayonet mount 22b of the rear conversion lens 20 is cut away by Δl relative to the corresponding tooth 11b' of the interchangeable lens 10. This tooth 22b' serves as a signal member which indicates that it is the rear conversion lens.

Figure 3:
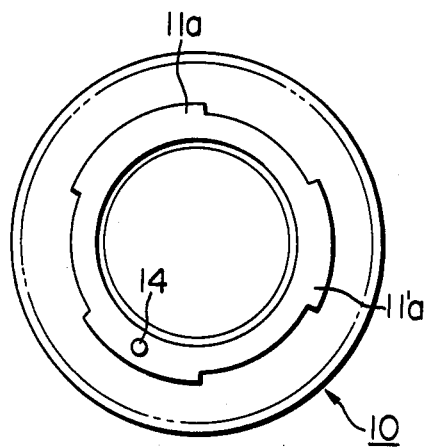
FIG. 3 is a front view of the mount portion of the interchangeable lens.
Figure 5:
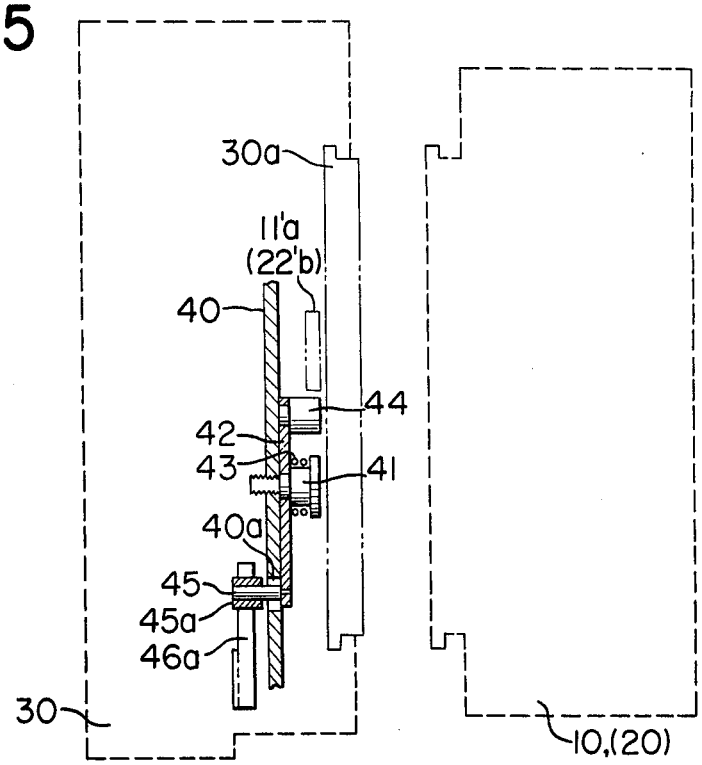
FIG. 5 is a cross-sectional view taken along line V—V of FIG. 6 and showing a mechanism for detecting the signal member according to an embodiment of the present invention.
Figure 6:
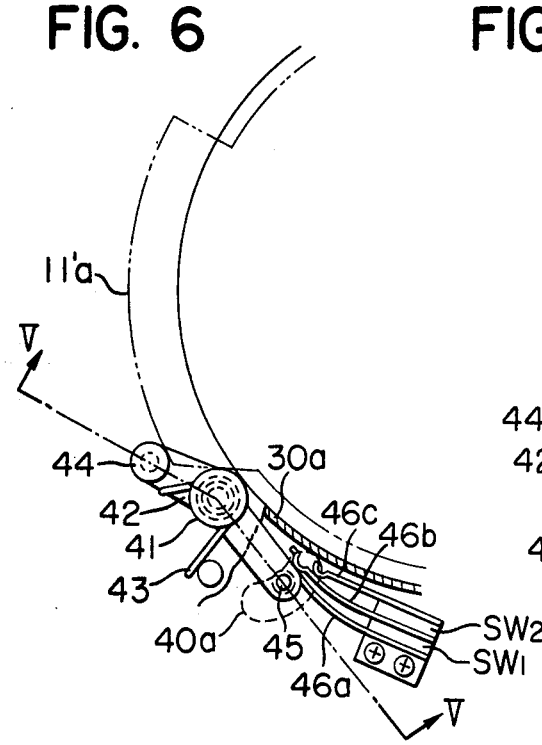
FIG. 6 is an enlarged front view of the detecting mechanism when the interchangeable lens has been mounted to the mount of the camera.
Figure 7:
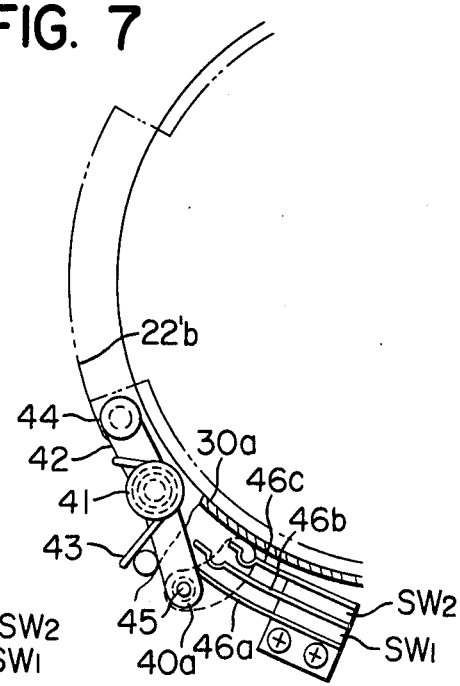
FIG. 7 is a front sectional view of the detecting mechanism when the conversion lens has been mounted to the mount of the camera.

FIGS. 5–7 show a mechanism for detecting the presence or absence of this cut-away and the detection result thereof ON-OFF-controls the switches SW1 and SW2 in FIG. 3.

Now, in FIGS. 5–7, a shaft 41 is studded in a base plate 40 fixed to a portion of the bayonet mount 30a secured to the camera body 30 that is adjacent to a mirror box (not shown). A lever 42 is rotatably supported on the shaft 41 and biased clockwisely by a return spring 43. A detecting pin 44 studded in the lever 42 detects whether or not the tooth 11a', 22b' is provided with the aforementioned cut-away when the male bayonet mount 11a or 22b has been mounted to the female bayonet mount 30a of the camera body. A pin 45 provided on the other end of the lever 42 and extending through a through-opening 40a in the base plate 40 controls the contact of contact pieces 46a, 46b, 46c constituting the switches Sw1 and SW2 by its end covered with an insulator 45a.

Now, when the interchangeable lens 10 is mounted to the camera body 30 by rotating the former counter-clockwisely as viewed in FIG. 6, the detecting pin 44 rides onto the tooth 11a' of the bayonet mount 11a upon completion of the mounting. Therefore, the lever 42 is rotated counter-clockwisely against the force of the spring 43 and the pin 45 urges the contact pieces 46a–46c counter-clockwisely. Accordingly, the contact pieces 46a and 46b (forming the siwtch SW1) contact each other and the contact pieces 46b and 46c (forming the switch Sw2) contact each other. Here, if the contact piece 46b is regarded as a common contact piece, the switches Sw1 and Sw2 of FIG. 3 are closed and the correction of the circuit is not effected.

Next, when the rear conversion lens 20 attached to the interchangeable lens 10 is mounted to the camera body 30 by rotating the former counter-clockwisely as viewed in FIG. 7, the detecting pin 44 does not ride onto the tooth 22b' upon completion of the mounting because the tooth 22b' of the bayonet mount 22b is cut away by Δl as previously mentioned. Accordingly, the lever 42 is not rotated. Consequently, the contact pieces 46a–46c are in non-contact position as shown in FIG. 7 and thus, the switches SW1 and SW2 are open. As a result, in FIG. 3, constant current flows to the resistors R9 and R10 and the voltage at the output terminal $out_1$ is shifted in accordance with the resistance values of these resistors. This amount of shift corresponds to the increase in F-number caused by the use of the rear conversion lens.

Since there are a plurality of types of rear conversion lens for changing the focal length of the interchangeable lens to double or triple, the switches SW1 and SW2 are provided as the switches to render the focal length correctable for these rear conversion lenses as well. That is, if the amount by which the lever 42 is rotated through the detecting pin 44 (namely, the diametral height of the tooth 22b') is made different for each rear conversion lens upon completion of the mounting (for example, such that the switches SW1 and SW2 are closed for the A type rear conversion lens but only the switch SW1 is closed for the B type rear conversion lens), correction for the plurality of types of rear conversion lenses will become possible.

Also, the signal member may be formed by cutting away an intermediate portion of the tooth of the bayonet mount, or the signal member may be provided in the neighborhood of the bayonet mount, namely, in the rear end surface of the lens.

We claim:

1. In an auxiliary lens capable of being mounted between an objective lens having on the mount thereof means for generating a minimum F-number signal and a camera including means for detecting said signal on a mount to which said objective lens may be mounted and a circuit receiving as input the detected signal and information based on the light passed through said objective lens to effect an exposure operation, a composite focal length of the objective lens with said auxiliary lens being different from the focal length of said objective lens, the improvement comprising:

transmitting means capable of being coupled to each of said minimum F-number signal generating means and said detecting means when the auxiliary lens is mounted between said camera and said objective lens, said transmitting means transmitting said signal to said detecting means by said coupling; and means for generating a correction signal having information corresponding to a variation in said F-number caused by the mounted auxiliary lens and capable of transmitting said correction signal to said circuit.

2. An auxiliary lens according to claim 1, wherein said correction signal generating means is secured to a mount portion which becomes opposed to said mount of said camera when said auxiliary lens is mounted between said camera and said objective lens and said correction signal represents a position signal.

3. An auxiliary lens according to claim 2, wherein each of the mounts of said objective lens and said auxiliary lens is a bayonet mount having a plurality of teeth projected in a direction orthogonal to the optical axis for meshing with the mount of said camera, and said correction signal generating means includes one of the teeth of the bayonet mount of said auxiliary lens.

4. An auxiliary lens according to claim 3, wherein said one tooth is formed with a cut-away in a direction orthogonal to the optical axis.

5. In a camera system comprising an objective lens having on the mount thereof means for generating a minimum F-number signal, a camera to which said objective lens may be mounted and including means for detecting said signal and a circuit receiving as input said detected signal and information based on the light passed through said objective lens to effect an exposure operation, and an auxiliary lens capable of being mounted between said objective lens and said camera, a composite focal length of the objective lens with the auxiliary lens being different from the focal length of said objective lens, the improvement comprising:

transmitting means provided on said auxiliary lens and capable of being coupled to each of said minimum F-number signal generating means and said detecting means when the auxiliary lens is mounted between the camera and the objective lens and transmitting said signal to said camera by said coupling;

means for generating a correction signal provided on the mount for mounting said auxiliary lens to said camera and having position information corresponding to a variation in said F-number caused by the mounted auxiliary lens; and correcting means including an operating member displaceably provided on said camera the operating member being capable of being coupled to said correction signal generating means when the auxiliary lens is mounted between the camera and the objective lens and displaceable by an amount corresponding to the position of said correction signal generating means, said correcting means further including a circuit for correcting said exposure operation circuit when operated by said operating member.

6. A camera system according to claim 5, wherein each of the mounts of said objective lens and said auxiliary lens is a bayonet mount having a plurality of teeth projected in a direction orthogonal to the optical axis, and said correction signal generating means includes one of the teeth of the bayonet mount of said auxiliary lens.

7. A camera system according to claim 6, wherein said one tooth is formed with a cut-away in a direction orthogonal to the optical axis.

8. A camera system according to claim 7, wherein said operating member includes an end capable of fitting into said cut-away during said mounting.

9. A camera system according to claim 5, wherein said exposure operation circuit includes a light receiving element provided with a predetermined electrical biasing level, and said correcting circuit includes switch means for varying said biasing level.

* * * * *